(12) United States Patent
Poppe

(10) Patent No.: US 10,920,842 B2
(45) Date of Patent: Feb. 16, 2021

(54) FOAM SPRING FOR PILLOWS, CUSHIONS, MATTRESSES OR THE LIKE AND METHOD FOR MANUFACTURING SUCH A FOAM SPRING

(75) Inventor: Willy Poppe, Sint-Niklaas (BE)

(73) Assignee: ELISANA S.A.R.L., Luxembourg (LU)

( * ) Notice: Subject to any disclaimer, the term of this patent is extended or adjusted under 35 U.S.C. 154(b) by 261 days.

(21) Appl. No.: 11/903,274

(22) Filed: Sep. 21, 2007

(65) Prior Publication Data
US 2009/0079119 A1    Mar. 26, 2009

(51) Int. Cl.
*F16F 1/37*     (2006.01)
*A47C 27/06*    (2006.01)

(52) U.S. Cl.
CPC ............ *F16F 1/37* (2013.01); *A47C 27/065* (2013.01)

(58) Field of Classification Search
CPC ........ F16F 1/37; A47C 27/063; A47C 27/065; B62D 3/10; Y10T 156/1026; Y10T 156/1038
USPC ............... 267/142, 143, 144, 145, 146, 152; 5/655.9, 718, 719, 740
See application file for complete search history.

(56) References Cited

U.S. PATENT DOCUMENTS

| | | | | |
|---|---|---|---|---|
| 4,194,255 A | * | 3/1980 | Poppe | A47C 27/065 267/153 |
| 4,903,358 A | * | 2/1990 | Creyf et al. | 5/655.9 |
| 6,026,527 A | * | 2/2000 | Pearce | A43B 13/04 5/654 |
| 6,347,423 B1 | * | 2/2002 | Stumpf | 5/720 |
| 9,221,374 B2 | * | 12/2015 | Kolich | B60N 2/64 |
| 2005/0172468 A1 | * | 8/2005 | Poppe | A47C 27/144 29/91.1 |
| 2006/0282954 A1 | * | 12/2006 | Poppe | A47C 27/064 5/720 |
| 2008/0093784 A1 | * | 4/2008 | Rawls-Meehan | A47C 7/027 267/80 |
| 2008/0203635 A1 | * | 8/2008 | Hascalovich | F16F 1/3605 267/148 |

FOREIGN PATENT DOCUMENTS

| | | | |
|---|---|---|---|
| BE | 878380 | | 2/1980 |
| BE | 1011070 A3 | | 4/1999 |
| EP | 0 624 332 A1 | | 11/1994 |
| EP | 0 762 011 A1 | | 3/1997 |
| EP | 0 793 932 A1 | | 9/1997 |
| EP | 0793932 | * | 9/1997 |
| EP | 0 872 198 A2 | | 10/1998 |
| EP | 1 046 365 A1 | | 10/2000 |
| GB | 185163 | * | 8/1922 |
| WO | WO 2005/020761 A1 | | 3/2005 |
| WO | WO 2005/074752 A1 | | 8/2005 |
| WO | WO 2007/003018 A1 | | 1/2007 |

* cited by examiner

*Primary Examiner* — Vishal R Sahni
(74) *Attorney, Agent, or Firm* — Brook Law Group, P.C.

(57) ABSTRACT

A foam spring for use in pillows, cushions, mattresses or the like, the foam spring having a tubular resilient body made of foam with holes extending inwardly from an outside surface to an inside surface, wherein the tubular body comprises at least one tubular foam layer and at least one reinforcing layer applied to said foam layer over at least a part of the axial length of the spring.

11 Claims, 5 Drawing Sheets

FOAM SPRING FOR PILLOWS, CUSHIONS, MATTRESSES OR THE LIKE AND METHOD FOR MANUFACTURING SUCH A FOAM SPRING

BACKGROUND OF THE INVENTION

1. Field of the Invention

The present invention concerns a foam spring in particular a foam spring with a tubular resilient body made of foam with holes extending inwards from the outside and which can be applied in the core of pillows, mattresses, armchair cushions or the like.

The invention also concerns a method of manufacturing such a foam spring.

2. Discussion of the Related Art

Such foam springs are known for example from U.S. Published Patent Application No. 2005172468 and European Patent Document No. 0.872.198, disclosing a foam spring made out of a foam layer strip of for example latex or polyurethane foam, provided with slits, whereby the strip is bent and two opposite ends of the strip are glued together to form a hollow tubular body with diamond shaped holes formed by stretching the slits in a lateral direction due to the bending of the strip.

Although known foam springs are very much valued by the users of the pillows, mattresses or the like, they have a disadvantage that they are easily damaged, for example during handling when assembling the pillows, mattresses or the like, due to high stretching forces applied to the springs.

Therefore, handling the springs needs to be done with some caution, which involves special care, often resulting in a slower production process and higher production costs.

Another drawback of the known springs is that when they are compressed in the axial direction, they tend to bulge out in a lateral direction, hence influencing the behaviour of the adjoining springs. Therefore the elastic behaviour of individual springs in a pillow, mattress or the like is sometimes difficult to predict so that accommodating a pillow, mattress or the like to a user's need or body shape is not an easy task.

Still another drawback is that in order to realize a foam spring with a relative high stiffness, a foam with a relatively high density has to be used, which is more expensive and which increases the weight of the pillow, mattress or the like.

SUMMARY OF THE INVENTION

It is an object of the present invention to provide a foam spring with improved properties for use in pillows, cushions, mattresses or the like.

To this end, the invention concerns a foam spring having a tubular resilient body made of foam with holes extending inwardly from an outside surface to an inside surface, wherein the tubular body comprises at least one tubular foam layer and at least one reinforcing layer applied to said foam layer over at least a part of the axial length of the spring.

Due to the reinforcing layer, a spring according to the invention is better resistant against damage due to rough handling during manufacturing and assembling of the pillow, mattress or the like. Therefore less care has to be taken not to damage the springs during handling, which is advantageous with respect to the production rate and production cost.

Another advantage of such a spring according to the invention is that it has less tendency to bulge out when compressed, so that its elastic property is less influenced by adjoining compressed springs, and that therefore the resilient behaviour of each individual spring can be better predicted when used in a pillow, mattress or the like.

Due to this predictable behaviour of the springs, it is easier to tailor a pillow, mattress or the like to a user's particular preferences or to his body shape and weight in order to give the user a great feeling of comfort.

These foam springs according to the invention can of course be combined with other types of springs in order to create different comfort zones with different softness in a pillow, mattress or the like.

The resilient behaviour of a spring according to the invention can easily be adapted by using a reinforcing layer with a different stretch resistance.

According to a preferred embodiment, the reinforcing layer can be made of a fabric or of a non-woven sheet material like for example a non-woven manufactured on a basis of polypropylene, which is a cheap material and readily available on the market.

Preferably the reinforcing layer is applied against the outside surface of the foam layer, but good results can also be obtained by applying the reinforcing layer against the inside surface of the foam layer or as an intermediate layer between two foam layers.

The invention also relates to a method for manufacturing a foam spring with a tubular, resilient body for use in pillows, mattresses or the like, which method comprises providing interrupted slits along lines extending in the longitudinal direction of a multi-layer band with at least one foam layer and at least one reinforcing layer; cutting a transverse strip out of this multi-layer; bending two opposite ends of the strip towards each other; and fixing the two opposite ends into a tubular shape to form the tubular resilient body.

BRIEF DESCRIPTION OF THE DRAWINGS

In order to better explain the characteristics of the invention, the following preferred embodiment of a foam spring and of a method according to the invention for manufacturing such a foam spring is described as an example only without being limitative in any way, with reference to the accompanying drawings, in which.

DESCRIPTION OF THE PREFERRED EMBODIMENT

Figure 1:
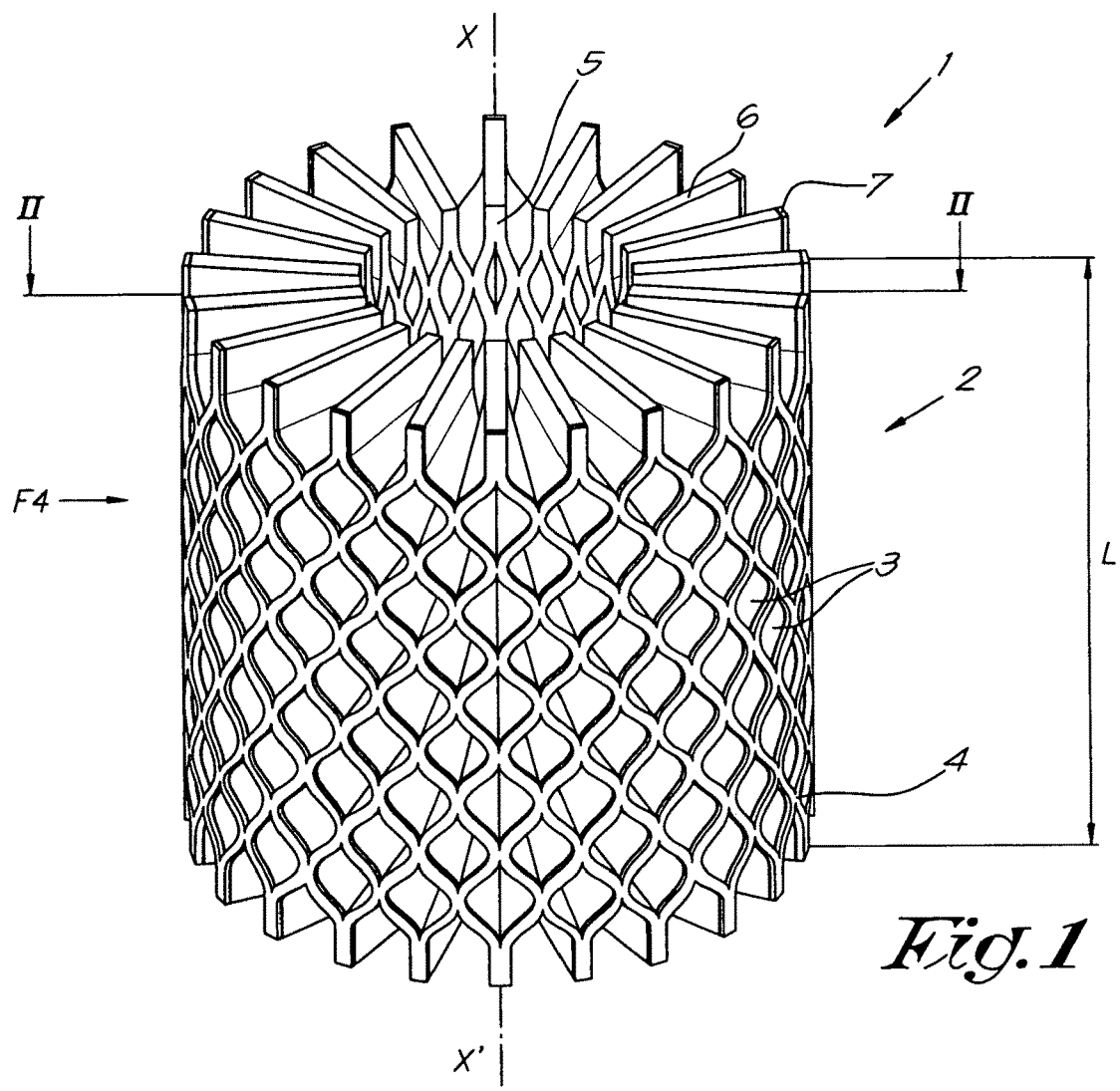
FIG. 1 represents a schematic perspective view of a foam spring according to the invention.
Figure 2:
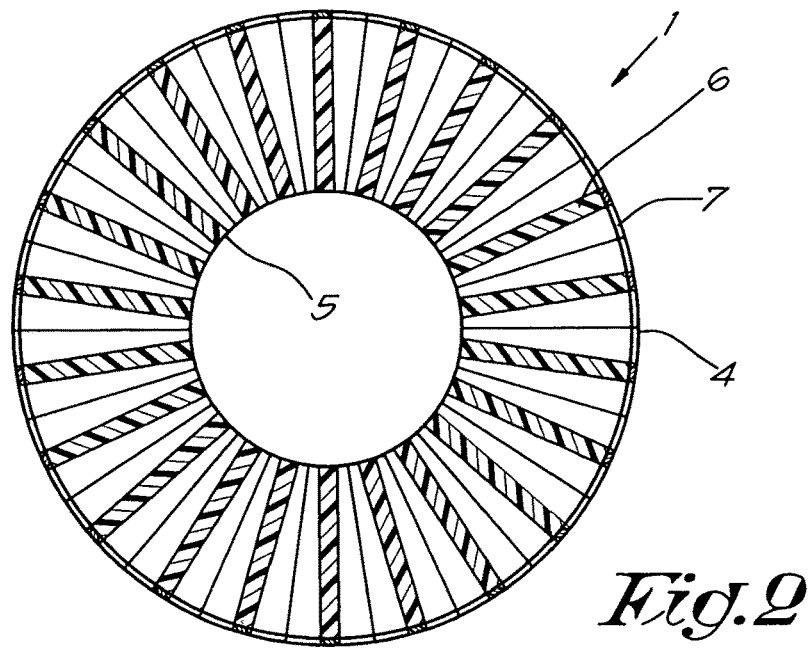
FIG. 2 is a cross-section according to line II-II in FIG. 1.

The spring represented in FIGS. 1 and 2 is a foam spring 1 for use in pillows, cushions, mattresses or the like, and is comprised of a tubular resilient body 2 with holes 3 extending inwardly from the outside surface 4 to the inside surface 5 of the spring 1.

The tubular body 2 comprises a foam layer 6 and a reinforcing layer 7 applied to said foam layer 6, for example by gluing.

In case of the embodiment of FIGS. 1 and 2, the reinforced layer is applied over the complete outside surface 5, in particular over the total axial length L of the spring 1.

The reinforcing layer has an enhanced stretch resistance and is for that matter preferably made of a fabric or of a non-woven sheet material, for example made of polypropylene.

Figure 3:
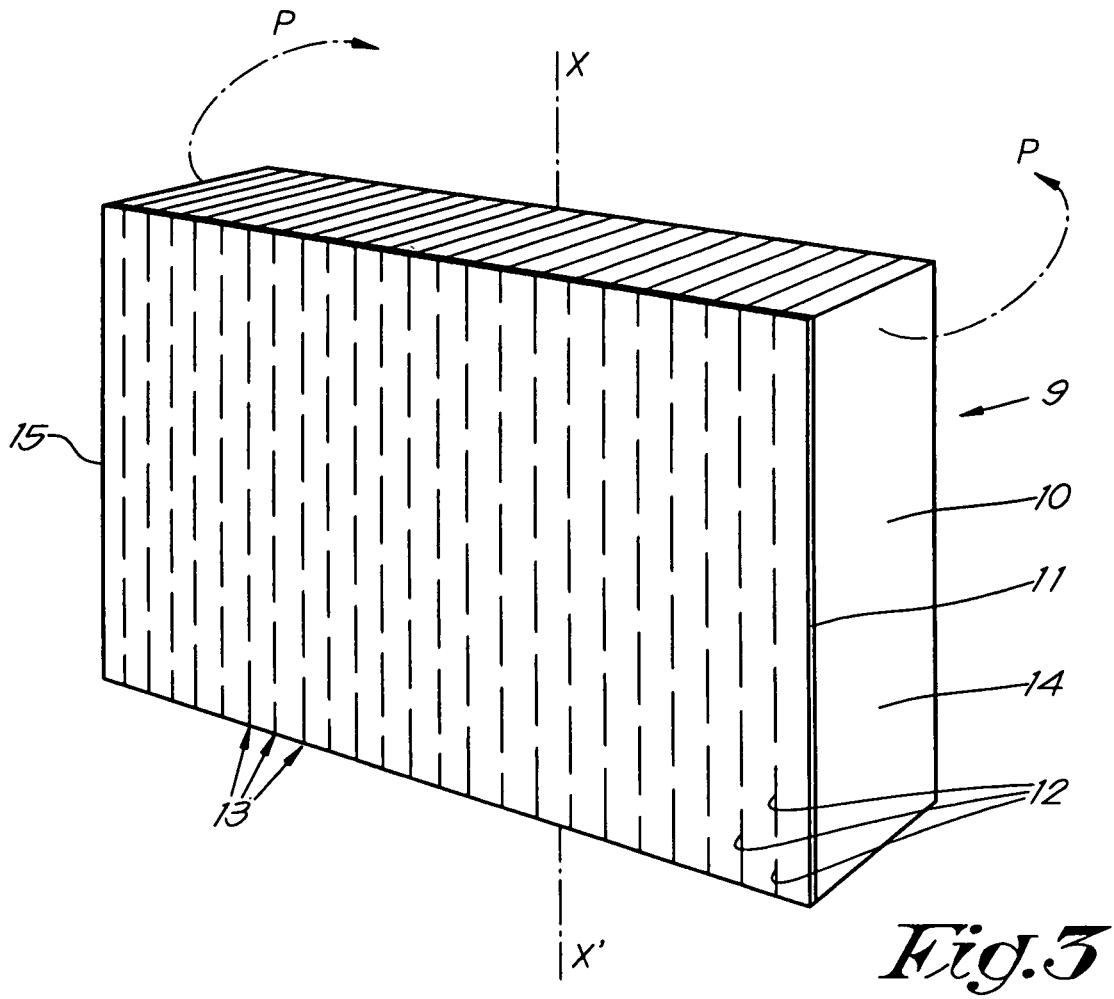
FIG. 3 represents a reinforced foam layer with slits used for manufacturing a foam spring according to the invention.

The foam spring 1 is made out of a multi-layer strip 3 as represented in FIG. 3 with a foam layer 10 and at least one reinforcing layer 11 applied to one side of the foam layer 10 and a series of slits 12 extending in a direction X-X' and extending throughout the foam layer 10 and reinforcing layer 11.

The slits 12 in the multi-layer strip 9 are cut along a plurality of interrupted parallel lines 13 at a distance from each other.

The slits 12 are advantageously positioned according to a staggered pattern, whereby the slits 12 along adjacent lines 13 are offset in their longitudinal direction X-X', for example over a distance equal to half the longitudinal length of the slits 12.

The strip 9 is provided with two opposite ends 14 and 15 extending in the direction X-X' of the slits 12, which opposite ends 14 and 15 are bent towards each other, as represented with the dotted arrows P in FIG. 3, and are fixed together, by gluing or other technique, to form said hollow tubular body 2 of the spring 1 with holes 3 that are diamond like shaped by stretching the slits 12 in a transversal direction due to the bending of the strip 9.

Figure 4:
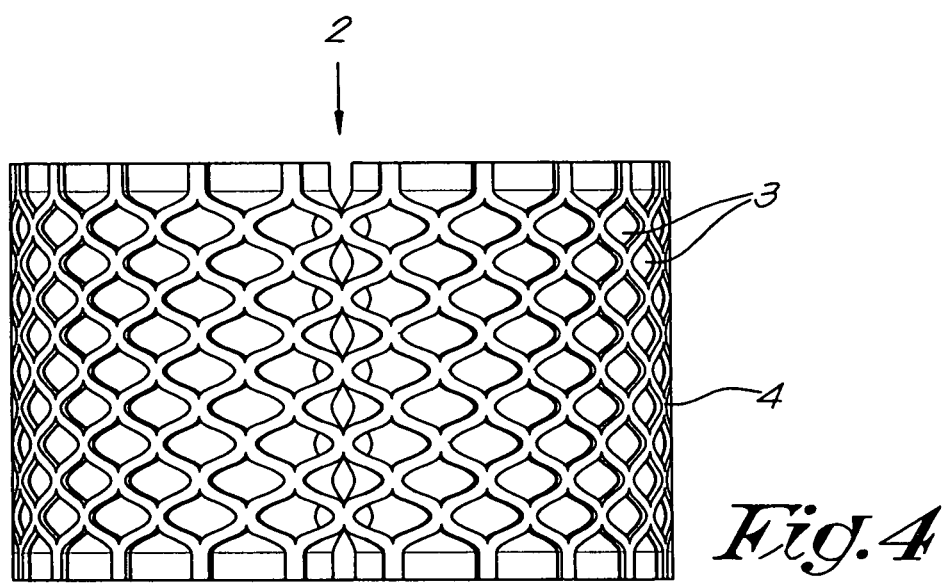
FIG. 4 is a side view according to arrow F4 in FIG. 1, but with the foam spring in a compressed situation.

An advantage of a multi-layer foam spring 1 as represented in FIGS. 1 and 2 is that when the spring is compressed in the axial direction X-X' as represented by arrow Z in FIG. 4, the foam spring 1 does not have the tendency to bulk out in a radial or lateral direction and that hence the diameter of the tubular spring is essentially preserved.

Figure 5:
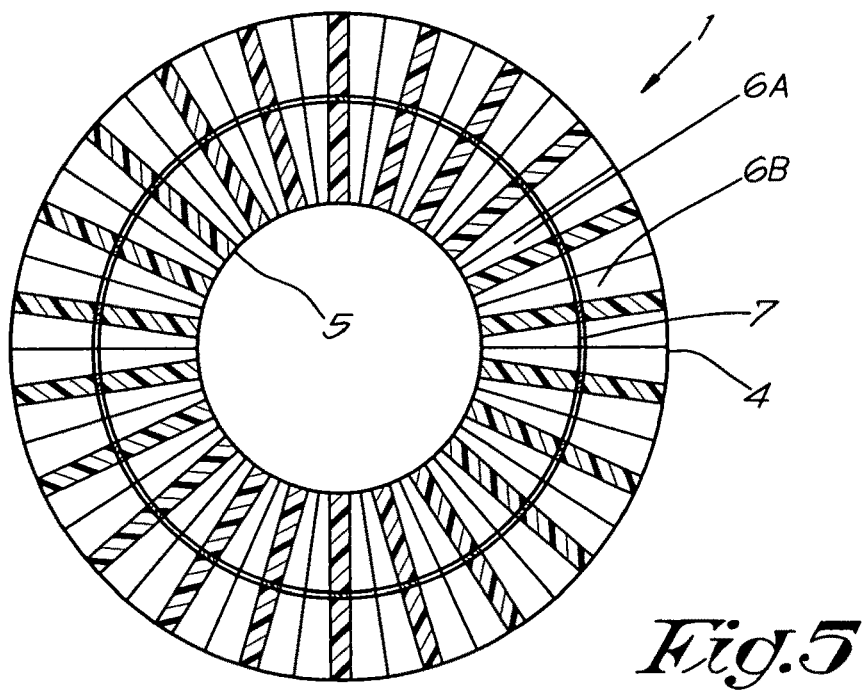
FIGS. 5 and 6 represent similar views as the FIGS. 2 and 3 but for another embodiment of a foam spring according to the invention.
Figure 6:
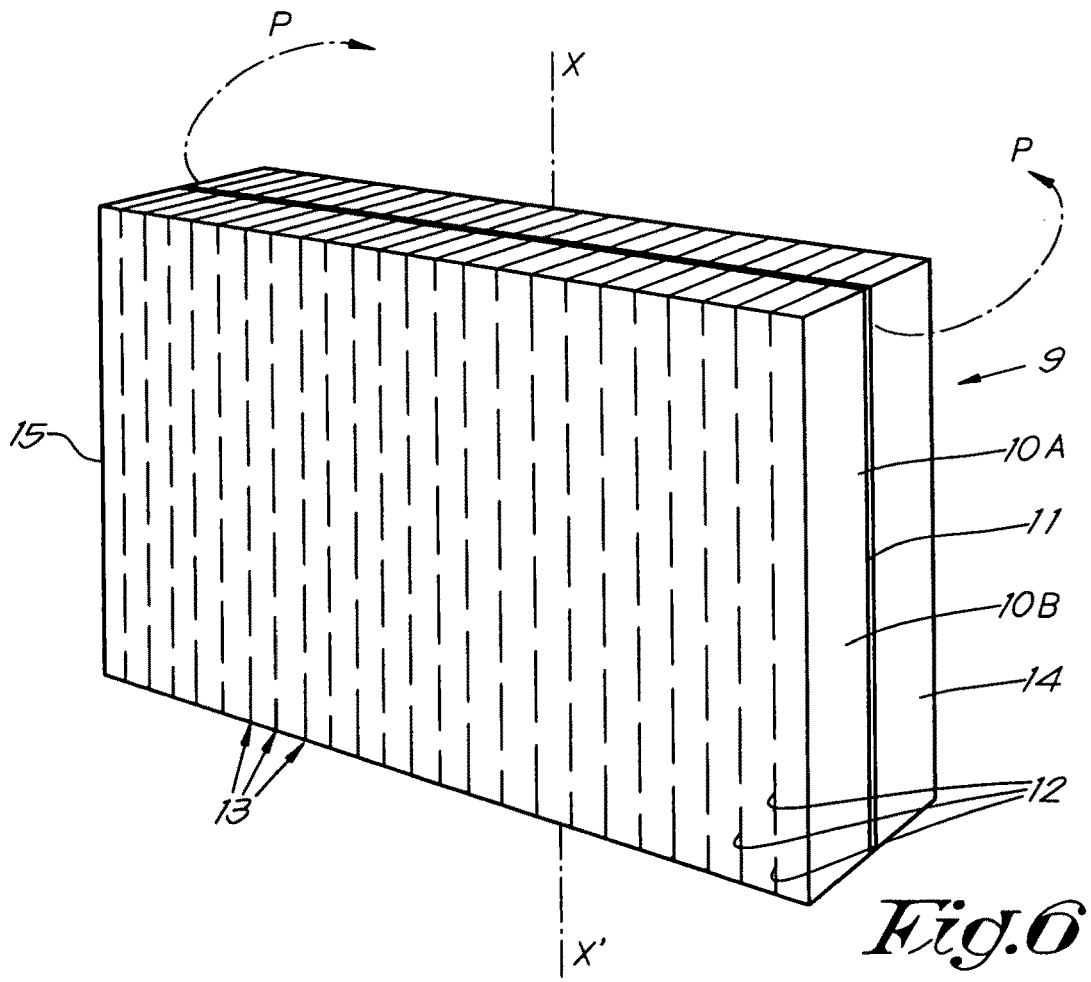

FIG. 5 represents another embodiment of a foam spring 1 according to the invention, wherein the reinforcing layer 7 is applied as an intermediate layer between two foam layers 6A and 6B.

This foam spring 1 is in this case made out of a slitted strip 9 with two foam layers 10A and 10B and an intermediate reinforcing layer 11 of which the ends 14 and 15 are glued together to form the tubular spring of FIG. 5.

Figure 7:
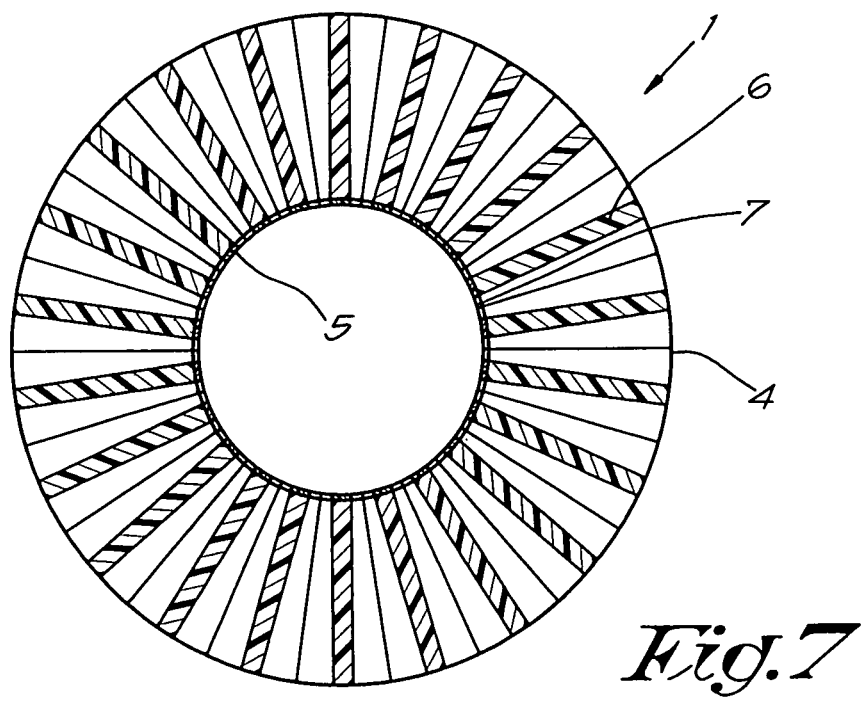
FIGS. 7 and 8, 9 and 10 respectively, represent similar views as the FIGS. 2 and 3 but respectively for two other embodiments of a foam spring according to the invention.
Figure 8:
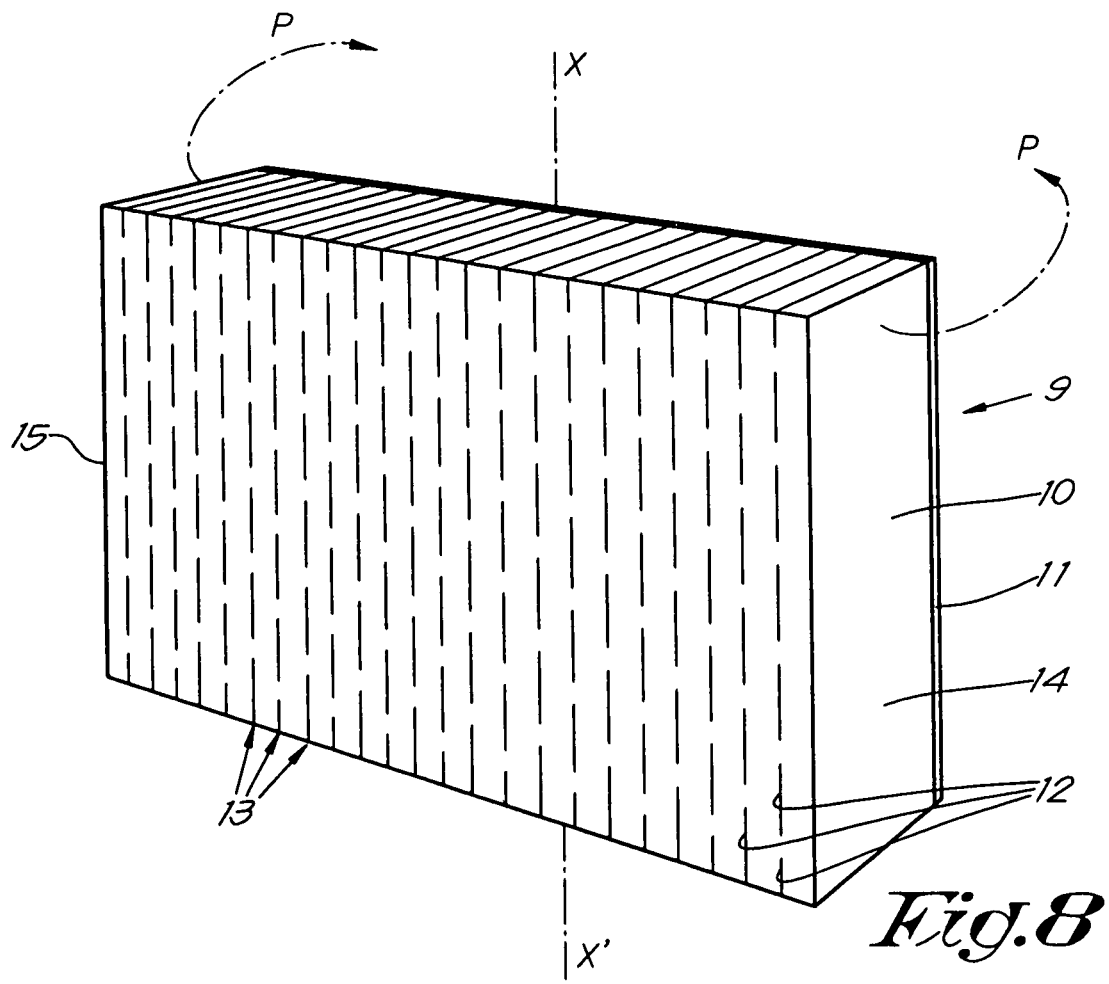

FIG. 7 represents still another embodiment of a foam spring 1 according to the invention, wherein this time the reinforced layer 7 is applied at the inside surface 5 of the foam layer 6, whilst FIG. 8 represents the strip 9 out of which the spring 1 of FIG. 7 can be formed.

Figure 9:
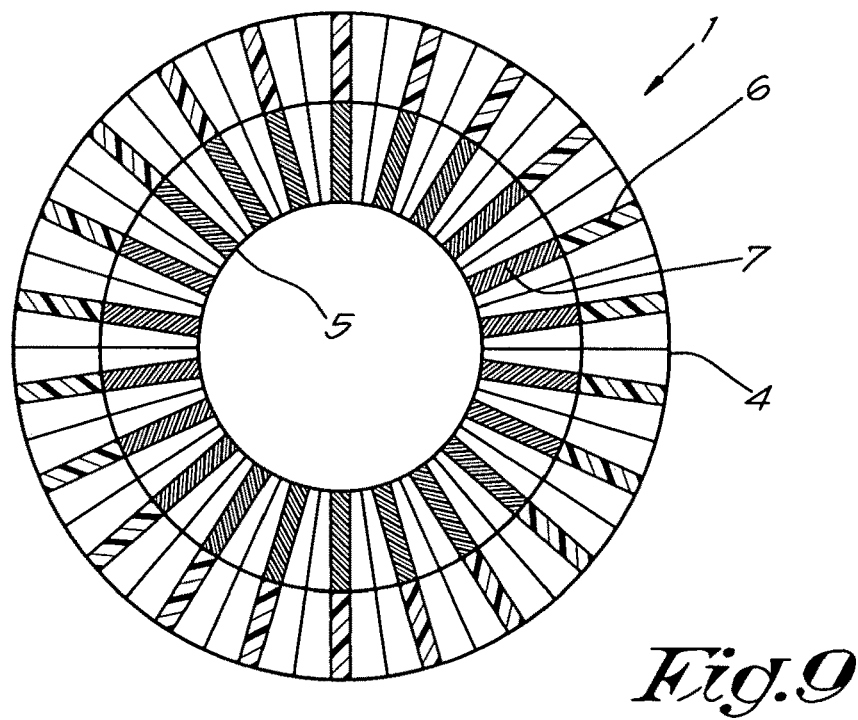

FIG. 9 demonstrates that the reinforcing layer 7 is not necessarily made out of a sheet material, but that this reinforcing layer 7 can also be realized by a second foam layer with an enhanced stretch resistance with regard to the first foam layer 6, for example by the use of a foam with a higher density or with incorporated reinforcing fibers or the like.

Figure 10:
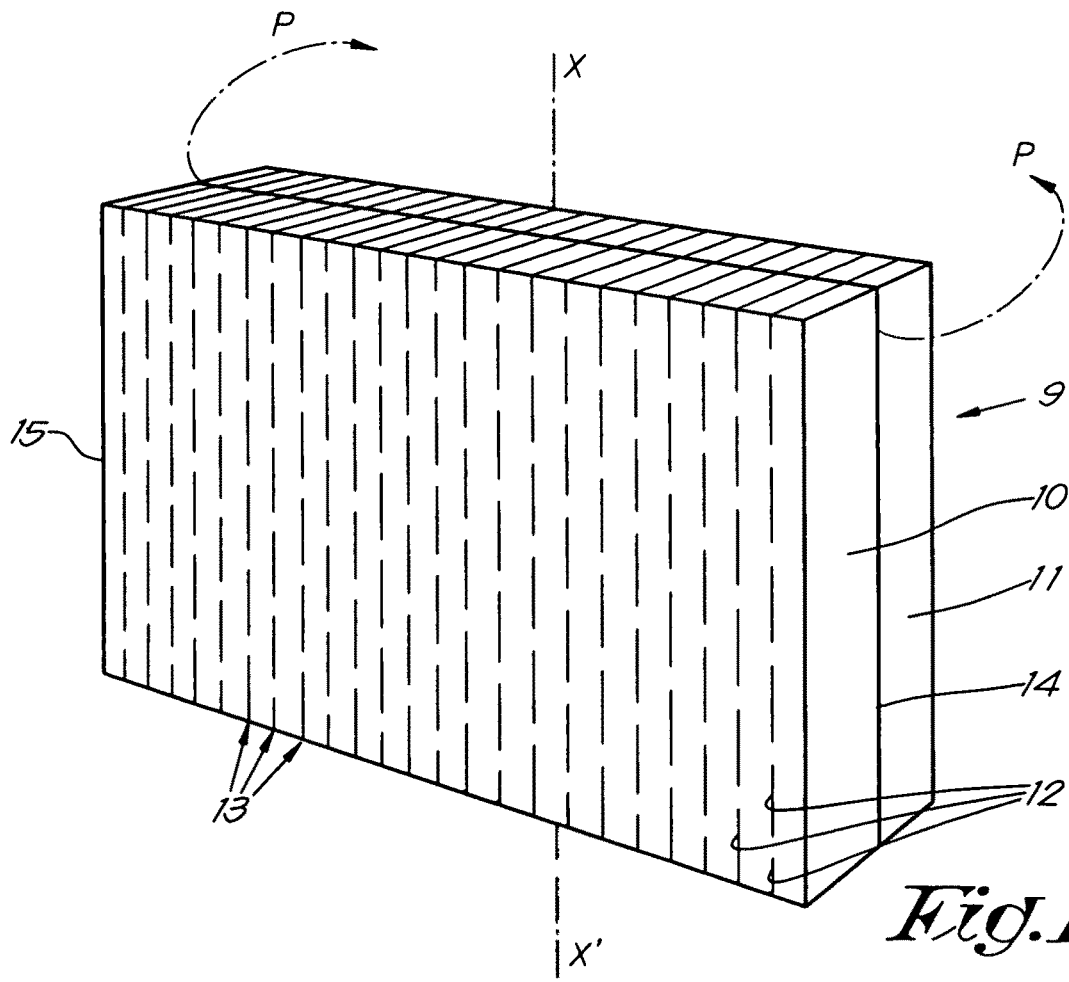

FIG. 10 represents the strip 9 that forms the basis for making the foam spring 1 of FIG. 9.

Although according to a preferred embodiment of the invention the reinforcing layer 7 extends over the total axial length L of the spring 1, it is not excluded that the reinforcing layer 7 only extends over a part of said axial length L.

The invention is not necessarily limited to cylindrical springs, but can also be applied to other shapes of springs.

The present invention is by no means limited to the above-described embodiments given as an example and represented in the accompanying drawings; on the contrary, such a foam spring and method for manufacturing such a spring can vary while still remaining within the scope of the invention.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A method of manufacturing a hollow tubular foam spring comprising:
    forming a multi-layer material band, including fixedly attaching at least a first resilient foam layer and a reinforcing layer using an adhesive, the reinforcing layer being constructed of a first material comprising a non-woven sheet material comprising polypropylene, the first resilient foam layer being constructed of a second material comprising foam, the second material differing from the first material;
    applying the reinforcing layer as an intermediate layer between the first resilient foam layer and a second resilient foam layer, the second resilient foam layer constructed of a third material comprising foam, wherein the reinforcing layer is applied radially exterior to the first foam tubular resilient layer;
    forming lines of spaced apart slits fully extending through the multi-layer material band, plural slits in the first resilient foam layer and the reinforcing layer aligned with one another whereby each of the aligned slits extend through the first resilient foam layer and reinforcing layer;
    cutting a transverse strip out of the multi-layer material band;
    bending two opposite ends of the strip towards each other; and
    fixing the two opposite ends to one another forming a tubular shape, the tubular shape defining a void core, the reinforcing layer positioned on a circumferentially curved outer side of the tubular shape, each of said aligned slits forming aligned holes, each of the aligned holes extending through the reinforcing layer.

2. A bulk resistant hollow tubular foam spring comprising:
    a reinforcing layer constructed of a first material comprising a non-woven sheet material comprising polypropylene;

a first foam tubular resilient layer constructed of a second material comprising foam, the second material differing from the first material, a second foam tubular resilient layer constructed of a third material comprising foam, wherein the reinforcing layer is applied as an intermediate layer between the first foam tubular resilient layer and the second foam tubular resilient layer, the first foam tubular resilient layer having:
 a first generally flat outer side,
 a second generally flat outer side on an opposite end of the first foam tubular resilient layer from the first generally flat outer side,
 a circumferentially curved outer side, and
 a circumferentially curved inner side defining an inner void;

an adhesive layer between at least the first foam tubular resilient layer and the reinforcing layer, the adhesive layer comprising an adhesive to affix the first foam tubular resilient layer to the reinforcing layer;

wherein the reinforcing layer is radially exterior to the circumferentially curved outer side of the first foam tubular resilient layer;

wherein the reinforcing layer covers at least half of the surface area of the circumferentially curved outer side of the foam tubular resilient layer, and the curved outer side of the foam tubular resilient layer is bonded to the reinforcing layer by the adhesive layer and is disposed radially inwardly from the reinforcing layer, and wherein the reinforcing layer has a greater stretch resistance than the first foam tubular resilient layer; and a plurality of radially extending passageways, in the first foam tubular resilient layer.

3. The foam spring according to claim 2, wherein the first material is a fabric.

4. The foam spring according to claim 2, wherein the reinforcing layer extends over a total axial length of the foam spring.

5. The foam spring according to claim 2, wherein the first foam tubular resilient layer, the second foam tubular resilient layer, and the reinforcing layer comprises a multi-layer strip, wherein opposite ends of the multi-layer strip are bent into proximity to each other and glue is applied to the opposite ends to form a tubular resilient body and wherein holes are formed in a diamond shape by stretching the plurality of radially extending passageways in a transverse direction due to a bending of the multi-layer strip.

6. The foam spring according to claim 5, wherein the plurality of radially extending passageways extend along a plurality of interrupted parallel lines.

7. The foam spring according to claim 6, wherein the plurality of radially extending passageways are positioned according to a staggered pattern, wherein the plurality of radially extending passageways along adjacent lines are offset in their longitudinal direction.

8. The foam spring according to claim 2, wherein the stretch resistant reinforcing layer is applied, via the first adhesive layer, over a total axial length of the first foam tubular resistant layer of the foam spring.

9. A bulk resistant tubular foam spring comprising:
 a stretch resistant reinforcing layer constructed of a first material comprising a non-woven sheet material comprising polypropylene;
 a first foam tubular resilient layer constructed of a second material comprising foam, the second material differing from the first material, the first foam tubular resilient layer having a circumferentially curved outer surface disposed radially outward from an axis of the first foam tubular resilient layer;
 a second foam tubular resilient layer constructed of a third material comprising foam;
 wherein the stretch resistant reinforcing layer is applied as an intermediate layer between the first foam tubular resilient layer and the second foam tubular resilient layer, the stretch resistant reinforcing layer being applied as an intermediate layer between the first foam tubular resilient layer and the second foam tubular resilient layer, the stretch resistant reinforcing layer being positioned radially exterior to the circumferentially curved outer surface of the first foam tubular resilient layer;
 wherein the stretch resistant reinforcing layer covers at least half of the surface area of the circumferentially curved outer surface of the foam tubular resilient layer,
 a first adhesive layer between at least the first foam tubular resilient layer and the stretch resistant reinforcing layer, the first adhesive layer comprising an adhesive to affix the stretch resistant reinforcing layer to the first foam tubular resilient layer; and
 a plurality of radially extending passageways, each extending fully through the first foam tubular resilient layer.

10. The foam spring according to claim 9 wherein the second foam tubular resilient layer concentrically surrounds the first foam tubular resilient layer and the stretch resistant reinforcing layer.

11. The foam spring according to claim 10 further comprising a second adhesive layer affixing the stretch resistant reinforcing layer to the second foam tubular resilient layer.

* * * * *